United States Patent
Nie et al.

(10) Patent No.: US 9,208,810 B1
(45) Date of Patent: Dec. 8, 2015

(54) DATA STORAGE DEVICE ATTENUATING INTERFERENCE FROM FIRST SPIRAL TRACK WHEN READING SECOND SPIRAL TRACK

(71) Applicant: Western Digital Technologies, Inc., Irvine, CA (US)

(72) Inventors: Jianbin Nie, Fremont, CA (US);
Charles A. Park, Aromas, CA (US);
Brian P. Rigney, Louisville, CO (US);
Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/560,407

(22) Filed: Dec. 4, 2014

Related U.S. Application Data

(63) Continuation-in-part of application No. 14/260,503, filed on Apr. 24, 2014, now Pat. No. 8,982,490.

(51) Int. Cl.
*G11B 5/02* (2006.01)
*G11B 5/596* (2006.01)

(52) U.S. Cl.
CPC ........ *G11B 5/59666* (2013.01); *G11B 5/59661* (2013.01)

(58) Field of Classification Search
CPC .. G11B 20/10009; G11B 27/36; G11B 5/012; G11B 5/00; G11B 2220/90; G11B 5/6005; G11B 5/024; G11B 5/0086; G11B 5/02
USPC ............ 360/53, 55, 39, 75, 69, 77.01, 57, 48, 360/77.08
See application file for complete search history.

(56) References Cited

U.S. PATENT DOCUMENTS

| | | | |
|---|---|---|---|
| 5,600,623 | A | 2/1997 | Miyazaki et al. |
| 5,668,679 | A | 9/1997 | Swearingen et al. |
| 5,754,352 | A | 5/1998 | Behrens et al. |
| 6,005,727 | A | 12/1999 | Behrens et al. |
| 6,014,283 | A | 1/2000 | Codilian et al. |
| 6,021,012 | A | 2/2000 | Bang |
| 6,038,209 | A | 3/2000 | Satoh |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,101,065 | A | 8/2000 | Alfred et al. |
| 6,104,153 | A | 8/2000 | Codilian et al. |
| 6,122,133 | A | 9/2000 | Nazarian et al. |
| 6,122,135 | A | 9/2000 | Stich |
| 6,141,175 | A | 10/2000 | Nazarian et al. |

(Continued)

OTHER PUBLICATIONS

Charles A. Park, et al., U.S. Appl. No. 14/260,503 12 pgs.

(Continued)

*Primary Examiner* — Nabil Hindi

(57) ABSTRACT

A data storage device is disclosed comprising a disk surface comprising a first spiral track at least partially overwritten by a second spiral track, and a head actuated over the disk surface based on the second spiral track. The first spiral track comprises a periodic pattern written at a first frequency, and the second spiral track comprises a periodic pattern written at a second frequency different from the first frequency.

14 Claims, 6 Drawing Sheets

(56) References Cited

U.S. PATENT DOCUMENTS

| | | | |
|---|---|---|---|
| 6,160,368 A | 12/2000 | Plutowski | |
| 6,181,502 B1 | 1/2001 | Hussein et al. | |
| 6,191,906 B1 | 2/2001 | Buch | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,318 B1 | 9/2001 | Hayashi | |
| 6,292,320 B1 | 9/2001 | Mason et al. | |
| 6,304,407 B1 | 10/2001 | Baker et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,411,453 B1 | 6/2002 | Chainer et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,519,107 B1 | 2/2003 | Ehrlich et al. | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,587,293 B1 | 7/2003 | Ding et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,704,156 B1 | 3/2004 | Baker et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,205 B1 | 5/2004 | Moran et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,943,978 B1 | 9/2005 | Lee | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,799 B1 | 11/2005 | Lee | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,985,316 B1 | 1/2006 | Liikanen et al. | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,002,761 B1 | 2/2006 | Sutardja et al. | |
| 7,006,320 B1 | 2/2006 | Bennett et al. | |
| 7,016,134 B1 | 3/2006 | Agarwal et al. | |
| 7,019,937 B1 | 3/2006 | Liikanen et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,533 B1 | 8/2006 | Shepherd et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,133,233 B1 | 11/2006 | Ray et al. | |
| 7,136,253 B1 | 11/2006 | Liikanen et al. | |
| 7,145,744 B1 | 12/2006 | Clawson et al. | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al. | |
| 7,215,504 B1 | 5/2007 | Bennett | |
| 7,224,546 B1 | 5/2007 | Orakcilar et al. | |
| 7,230,786 B1 | 6/2007 | Ray et al. | |
| 7,248,426 B1 | 7/2007 | Weerasooriya et al. | |
| 7,251,098 B1 | 7/2007 | Wang et al. | |

(56) References Cited

U.S. PATENT DOCUMENTS

| | | | |
|---|---|---|---|
| 7,253,582 B1 | 8/2007 | Ding et al. | |
| 7,253,989 B1 | 8/2007 | Lau et al. | |
| 7,256,956 B2 | 8/2007 | Ehrlich | |
| 7,265,933 B1 | 9/2007 | Phan et al. | |
| 7,289,288 B1 | 10/2007 | Tu | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,330,019 B1 | 2/2008 | Bennett | |
| 7,330,327 B1 * | 2/2008 | Chue et al. | 360/75 |
| 7,333,280 B1 | 2/2008 | Lifchits et al. | |
| 7,333,286 B2 | 2/2008 | Jung et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,382,564 B1 | 6/2008 | Everett et al. | |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,405,897 B2 | 7/2008 | Dougherty et al. | |
| 7,411,758 B1 | 8/2008 | Cheung et al. | |
| 7,414,809 B2 | 8/2008 | Smith et al. | |
| 7,433,143 B1 | 10/2008 | Ying et al. | |
| 7,440,210 B1 | 10/2008 | Lee | |
| 7,440,225 B1 | 10/2008 | Chen et al. | |
| 7,450,334 B1 | 11/2008 | Wang et al. | |
| 7,450,336 B1 | 11/2008 | Wang et al. | |
| 7,453,661 B1 | 11/2008 | Jang et al. | |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,486,460 B2 * | 2/2009 | Tsuchinaga et al. | 360/48 |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 * | 3/2009 | McCornack | 360/75 |
| 7,522,370 B1 | 4/2009 | Sutardja | |
| 7,529,055 B1 | 5/2009 | Laks et al. | |
| 7,542,225 B1 | 6/2009 | Ding et al. | |
| 7,548,392 B1 | 6/2009 | Desai et al. | |
| 7,551,387 B2 | 6/2009 | Sun et al. | |
| 7,551,390 B1 | 6/2009 | Wang et al. | |
| 7,558,016 B1 | 7/2009 | Le et al. | |
| 7,561,361 B1 | 7/2009 | Rutherford | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,619,846 B2 | 11/2009 | Shepherd et al. | |
| 7,623,313 B1 | 11/2009 | Liikanen et al. | |
| 7,626,782 B1 | 12/2009 | Yu et al. | |
| 7,630,162 B2 | 12/2009 | Zhao et al. | |
| 7,639,445 B2 | 12/2009 | Matsunaga et al. | |
| 7,639,446 B2 | 12/2009 | Mizukoshi et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,663,835 B1 | 2/2010 | Yu et al. | |
| 7,675,705 B2 | 3/2010 | Mizukoshi et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,697,233 B1 | 4/2010 | Bennett et al. | |
| 7,701,661 B1 | 4/2010 | Bennett | |
| 7,710,676 B1 | 5/2010 | Chue | |
| 7,715,138 B1 | 5/2010 | Kupferman | |
| 7,715,143 B2 | 5/2010 | Bliss et al. | |
| 7,728,539 B2 | 6/2010 | Smith et al. | |
| 7,729,079 B1 | 6/2010 | Huber | |
| 7,733,189 B1 | 6/2010 | Bennett | |
| 7,733,588 B1 | 6/2010 | Ying | |
| 7,737,793 B1 | 6/2010 | Ying et al. | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,751,144 B1 | 7/2010 | Sutardja | |
| 7,760,461 B1 | 7/2010 | Bennett | |
| 7,787,211 B2 | 8/2010 | Kim et al. | |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,852,598 B1 | 12/2010 | Sutardja | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,881,004 B2 | 2/2011 | Kumbla et al. | |
| 7,881,005 B1 | 2/2011 | Cheung et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,027,114 B1 * | 9/2011 | Han et al. | 360/51 |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,390,367 B1 | 3/2013 | Bennett | |
| 8,427,932 B2 | 4/2013 | Inoue et al. | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,462,458 B1 | 6/2013 | Ton-That et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |

(56) References Cited

U.S. PATENT DOCUMENTS

| | | | |
|---|---|---|---|
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,308 B1 * | 4/2014 | Katchmart | 360/55 |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,917,474 B1 | 12/2014 | Rigney et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |
| 2007/0291401 A1 | 12/2007 | Sun et al. |
| 2009/0086357 A1 | 4/2009 | Ehrlich |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

OA dated Jul. 17, 2014 from U.S. Appl. No. 14/260,503 53 pgs.
NOA dated Nov. 7, 2014 from U.S. Appl. No. 14/260,503 6 pgs.
NOA dated Dec. 26, 2014 from U.S. Appl. No. 14/260,503 2 pgs.

* cited by examiner

SERVO HEAD OVER DISK BASED ON 2ND SPIRAL TRACK — 35

DATA STORAGE DEVICE ATTENUATING INTERFERENCE FROM FIRST SPIRAL TRACK WHEN READING SECOND SPIRAL TRACK

This application is a continuation-in-part of U.S. patent application Ser. No. 14/260,503, filed on Apr. 24, 2014, entitled "DATA STORAGE DEVICE READING FIRST SPIRAL TRACK WHILE SIMULTANEOUSLY WRITING SECOND SPIRAL TRACK" to Charles A. Park et al., the disclosure of which is incorporated herein by reference.

BACKGROUND

When manufacturing a disk drive, concentric servo sectors $6_0$-$6_N$ are written to a disk 2 which define a plurality of radially-spaced, concentric servo tracks 6 as shown in the prior art disk format of FIG. 1. A plurality of concentric data tracks are defined relative to the servo tracks 4, wherein the data tracks may have the same or a different radial density (tracks per inch (TPI)) than the servo tracks 4. Each servo sector (e.g., servo sector $6_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target data track during a seek operation, and the servo bursts 14 are processed to maintain the head over a centerline of the target data track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, a known technique for self-servo writing a disk drive is to first write a plurality of spiral tracks to the disk, and then to servo on the spiral tracks while writing a plurality of servo sectors that define concentric servo tracks such as shown in FIG. 1.

DETAILED DESCRIPTION OF EMBODIMENTS OF THE INVENTION

Figure 2A:
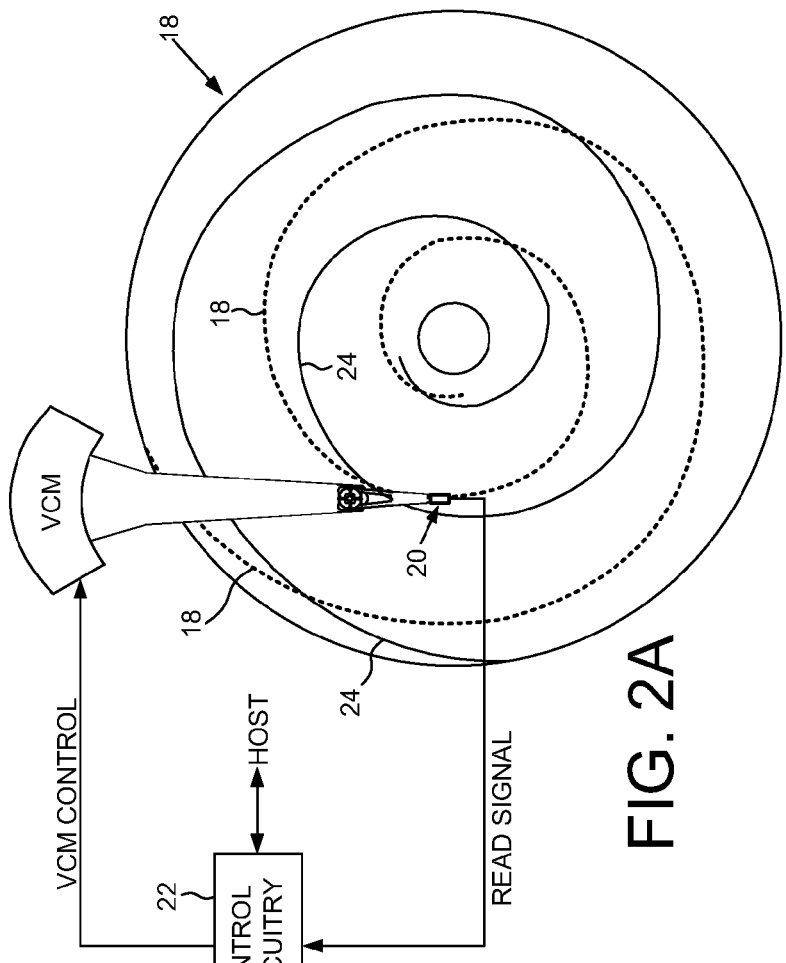
FIG. 2A shows a data storage device in the form of a disk drive according to an embodiment comprising a head actuated over a disk surface.
Figure 2B:
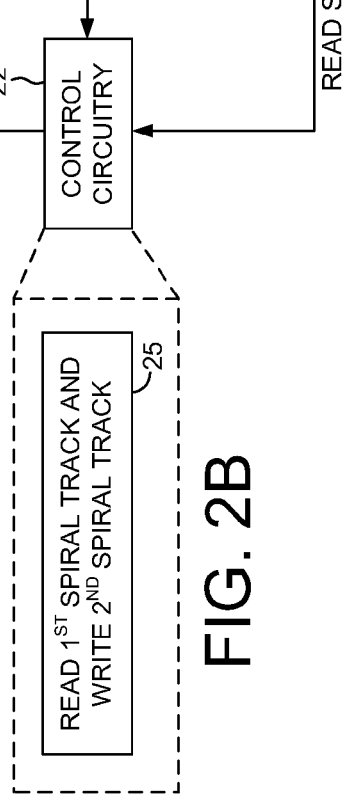
FIG. 2B is a flow diagram according to an embodiment wherein while reading a first spiral track on the disk surface a second spiral track is simultaneously written on the disk surface.

FIG. 2A shows a data storage device in the form of a disk drive according to an embodiment comprising a disk surface 16 comprising a first spiral track 18, and a head 20 actuated over the disk surface 16. The disk drive further comprises control circuitry 22 configured to execute the flow diagram of FIG. 2B, wherein while reading the first spiral track 18 a second spiral track 24 is simultaneously written on the disk surface (block 25).

In one embodiment, the first spiral track 18 may be considered a "bootstrap" spiral track from which the head 20 may be servoed in order to write the second spiral track 24 which may be considered a servo spiral track. In one embodiment, the disk surface 16 may comprise a plurality of bootstrap spiral tracks which may be read in order to write a plurality of servo spiral tracks. The servo spiral tracks may then be processed in order to servo the head 20 radially over the disk surface 16 in order to write servo sectors that define concentric servo tracks. In another embodiment, the servo spiral tracks may be used as a final servo pattern for servoing the head during normal access operations without needing to write servo sectors to the disk surface.

In one embodiment, the first spiral track 18 (as well as other similar spiral tracks if needed) may be self-written to the disk surface 16 by the control circuitry 22 internal to the disk drive. An example embodiment for self-writing spiral tracks is disclosed in U.S. Pat. No. 8,634,283 entitled "DISK DRIVE PERFORMING IN-DRIVE SPIRAL TRACK WRITING" the disclosure of which is incorporated herein by reference. In another embodiment, the first spiral track 18 (e.g., bootstrap spiral track) may be written to the disk surface 16 using an external servo writer prior to installing the disk into the disk drive.

Figure 2C:
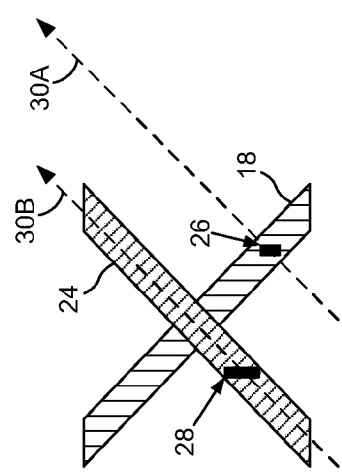
FIG. 2C illustrates the writing of a second spiral track while simultaneous reading a first spiral track according to an embodiment, wherein the second spiral track is written in an opposite radial direction as the first spiral track.

FIGS. 2A and 2C illustrate an example embodiment wherein the second spiral track 24 is written in an opposite radial direction as the first spiral track 18. That is, the first spiral track 18 is written from the inner diameter (ID) of the disk surface 16 toward the outer diameter (OD) of the disk surface 16, and the second spiral track 24 is written from the OD to the ID of the disk surface 16. FIG. 2C also illustrates an embodiment wherein the head 20 comprises a read element 26 that is offset circumferentially from a write element 28 by a reader/writer gap. Accordingly in this embodiment while writing the second spiral track 24 the read element 26 travels along trajectory 30A and reaches the first spiral track 18 before the write element 28 overwrites the first spiral track 18 while travelling along trajectory 30B. In this manner, even if the read element 26 and the write element 28 are aligned so as to both travel along trajectory 30B, the read element 26 reads the first spiral track 18 before it is overwritten by the write element 28.

Figure 3:
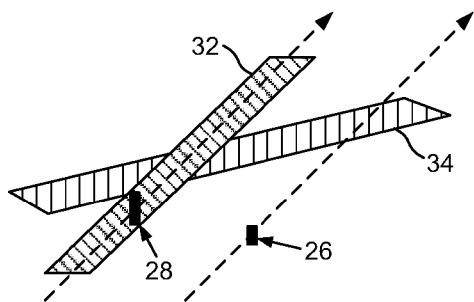
FIG. 3 illustrates the writing of a second spiral track while simultaneous reading a first spiral track according to an embodiment, wherein the second spiral track is written in the same radial direction as the first spiral track.

In another embodiment illustrated in FIG. 3, the second spiral track 32 is written in the same radial direction as the first spiral track 34 (e.g., from the OD to the ID). In this embodiment, the second spiral track 32 is written at a different radial velocity than the first spiral track 34 such that the slope of the second spiral track 32 is different from the slope of the first spiral track 34. This ensures the head 20 will cross over the first spiral track 34 when writing the second spiral track 32 as illustrated in FIG. 3. In the example of FIG. 3, the second spiral track 32 is written at a higher radial velocity than the first spiral track 34 such that the slope of the second spiral track 32 is greater than the slope of the first spiral track 34. In another embodiment, the second spiral track 32 may be written at a lower radial velocity than the first spiral track 34.

Figure 4A:
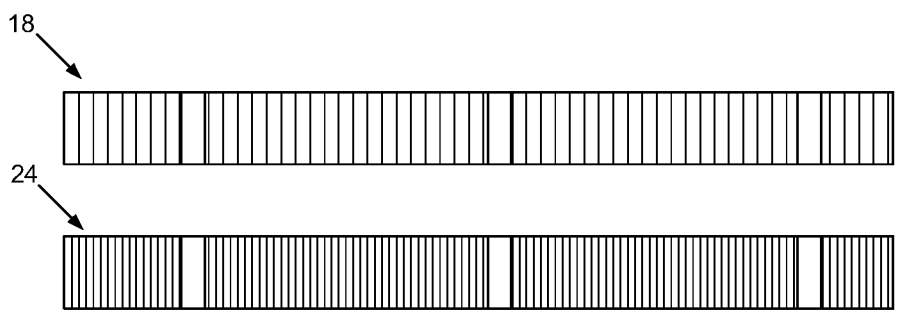
FIG. 4A illustrates an embodiment wherein the first spiral track comprises a periodic pattern written at a first frequency, and the second spiral track comprises a periodic pattern written at a second frequency different from the first frequency.
Figure 4B:
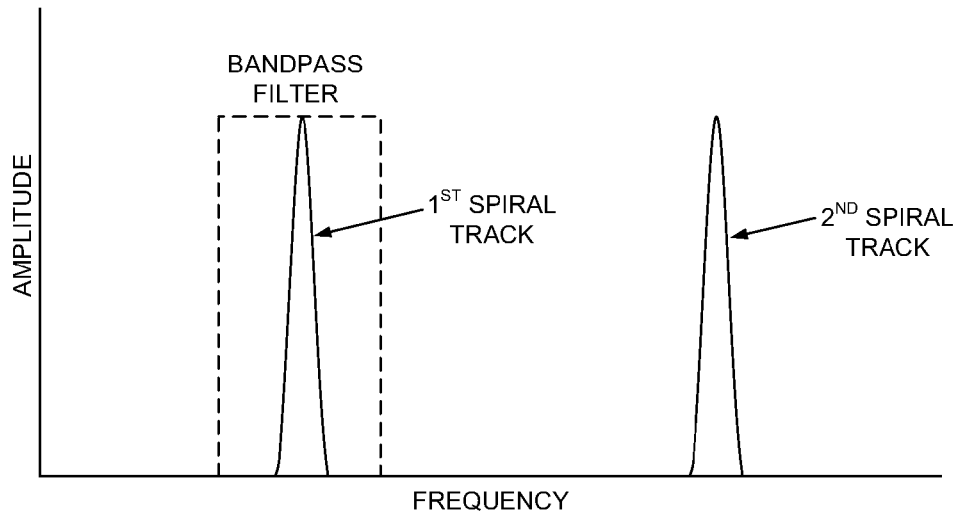
FIG. 4B shows an embodiment wherein a read signal generated while reading the first spiral track is bandpass filtered based on the frequency of the first spiral track to attenuate crosstalk caused by simultaneously writing the second spiral track on the disk surface at the second frequency.

FIG. 4A illustrates an embodiment wherein the first spiral track 18 comprises a periodic pattern written at a first frequency (periodically interrupted by a sync mark), and the second spiral track 24 comprises a periodic pattern written at a second frequency (periodically interrupted by a sync mark) different from the first frequency. This embodiment may help attenuate crosstalk in the read signal generated while reading the first spiral track 18 while simultaneously writing the second spiral track 24. In one embodiment, the control circuitry may filter the read signal generated while reading the first spiral track 18 based on the frequency of the periodic pattern in the first spiral track 18. FIG. 4B illustrates an example of this embodiment wherein the control circuitry may bandpass filter the read signal to extract the frequency component in the read signal corresponding to the periodic pattern in the first spiral track 18.

In the example of FIGS. 4A and 4B, the periodic pattern in the first spiral track 18 comprises a lower frequency than the periodic pattern in the second spiral track 24. However, in other embodiments the periodic pattern in the first spiral track 18 may comprise a higher frequency than the periodic pattern in the second spiral track 24. Any suitable delta between the frequencies may be employed, and in one embodiment the frequencies and the delta are selected to reduce the implementation cost and complexity of the bandpass filter.

In the embodiment of FIG. 2C, the second spiral track 24 is written continuously so as to eventually overwrite the first spiral track 18 as the write element 28 passes over the first spiral track 18. This embodiment may improve performance while servoing on the second spiral track 24 since in one embodiment there are no gaps (or a reduced number of gaps) in the second spiral track 24. In one embodiment, when reading the second spiral track 24, for example to servo the head 20 over the disk surface 16 while writing servo sectors of concentric servo tracks, the resulting read signal may be filtered based on the frequency of the periodic pattern in the second spiral track 24. For example, the read signal may be bandpass filtered so as to extract the frequency component corresponding to the second spiral track 24, thereby attenuating interference from the periodic pattern in the first spiral track 18 near the locations where the second spiral track 24 overwrites the first spiral track 18.

Figure 5A:
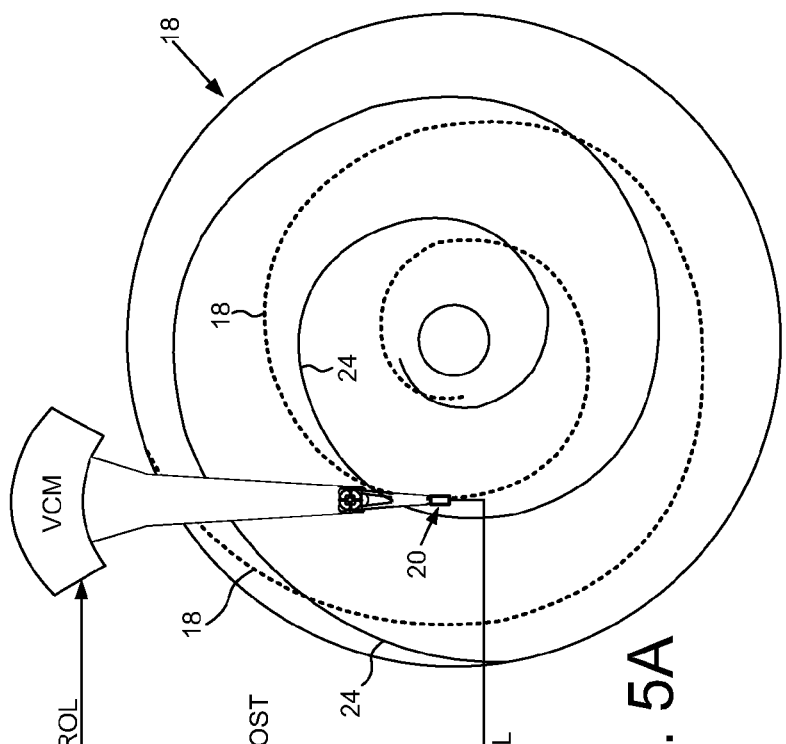
FIG. 5A shows a data storage device in the form of a disk drive comprising a head actuated over a disk surface comprising a first spiral track at least partially overwritten by a second spiral track.
Figure 5B:
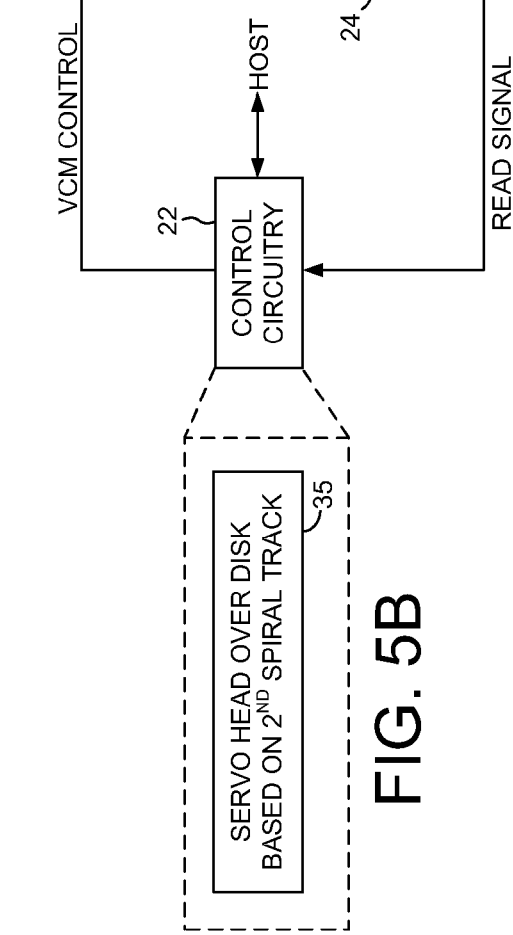
FIG. 5B is a flow diagram according to an embodiment wherein the head is servoed over the disk surface based on the second spiral track.

FIG. 5A shows a data storage device in the form of a disk drive according to an embodiment comprising a disk surface 16 comprising a first spiral track 18 at least partially overwritten by a second spiral track 24. The disk drive further comprises control circuitry 22 configured to execute the flow diagram of FIG. 5B, wherein a head 20 is actuated over the disk surface 16 based on the second spiral track 24 (block 35).

Figure 1:
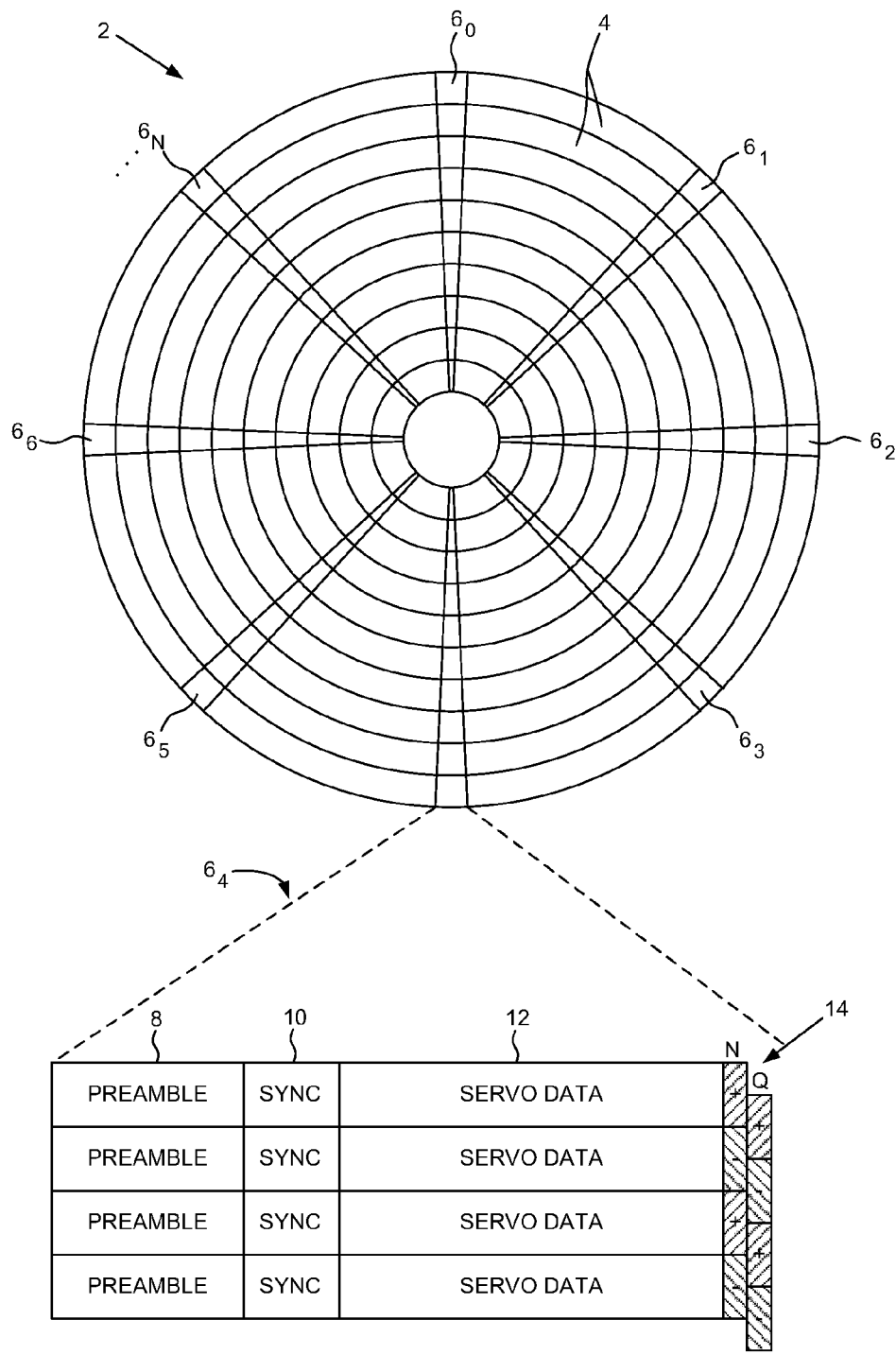
FIG. 1 shows a prior art disk format comprising a plurality of servo tracks defined by servo sectors.
Figure 5C:
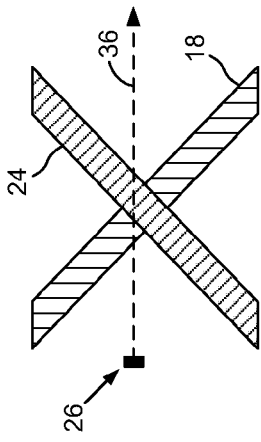
FIG. 5C illustrates an embodiment wherein the read element of the head passes over the second spiral track as well as part of the first spiral track.

FIGS. 5A and 5C illustrates an example embodiment wherein the second spiral track 24 is written in an opposite radial direction as the first spiral track 18 similar to the embodiment described above with reference to FIG. 2C. In one embodiment, the control circuitry 22 servos the head 20 in a substantially concentric path 36, for example, while writing concentric servo sectors to the disk such as shown in FIG. 1. As illustrated in FIG. 5C, the read element 26 may pass over the second spiral track 24 at a radial location where the second spiral track 24 overwrites the first spiral track 18, and therefore there may be interference in the read signal due to reading at least part of the first spiral track 18. This interference may reduce the accuracy of the resulting position signal generated based on demodulating the second spiral track 24. Accordingly, in order to reduce this interference, in one embodiment the first spiral track 18 comprises a periodic pattern written at a first frequency, and the second spiral track 24 comprises a periodic pattern written at a second frequency different from the first frequency. In the embodiment shown in FIG. 5C, the second frequency is higher than the first frequency; however in another embodiment the second frequency may be lower than the first frequency.

Figure 6:
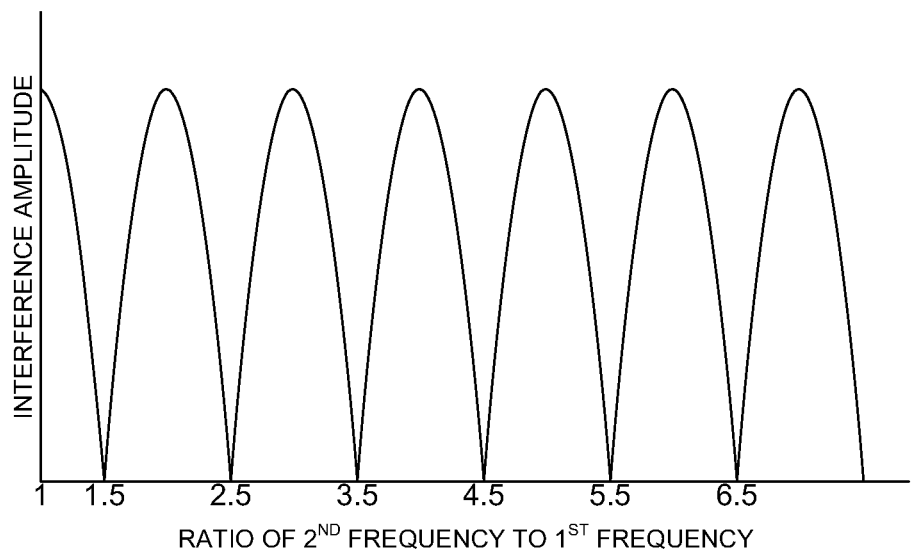
FIG. 6 illustrates an embodiment wherein a ratio of frequencies between the first and second spiral tracks attenuates interference from the first spiral track when demodulating the read signal generated while reading the second spiral track.
Figure 7:
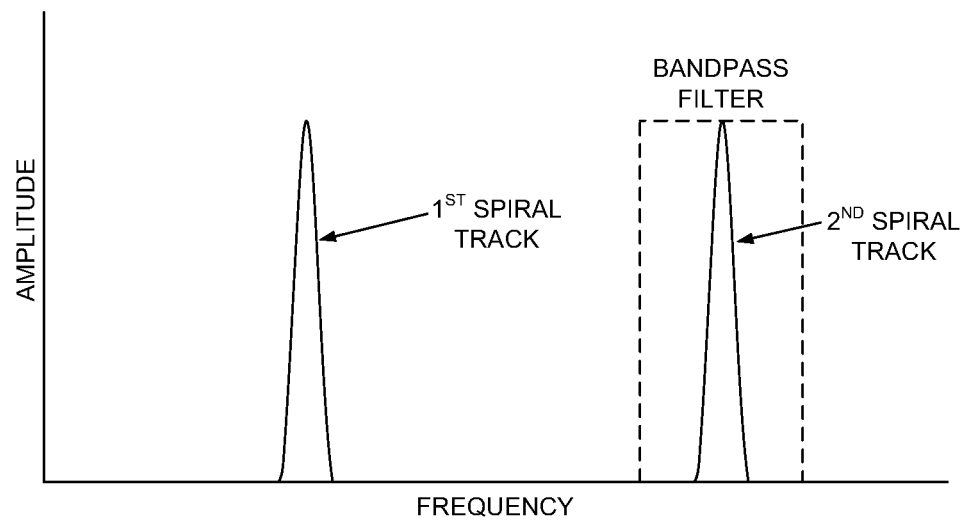
FIG. 7 shows an embodiment wherein the read signal is filtered with a bandpass filter to attenuate interference from the first spiral track.

In one embodiment, the second spiral track 24 may be demodulated by processing the read signal samples to compute a discrete Fourier transform (DFT) at the second frequency using any suitable technique. When demodulating the second spiral track 24 using a DFT, the interference from the first spiral track 18 may be attenuated when the ratio between the second frequency and the first frequency is substantially an integer plus one-half as shown in FIG. 6. The ratio may be inverted in the embodiment where the second frequency is lower than the first frequency (i.e., the interference from the first spiral track 18 may be attenuated when the ratio between the first frequency and the second frequency is substantially an integer plus one-half). In another embodiment shown in FIG. 7, the control circuitry 22 may bandpass filter the read signal proximate the second frequency, thereby attenuating interference from the first spiral track 18. The bandpass filtering may be implemented in any suitable manner, including in the analog domain and/or in the digital domain.

Figure 8A:
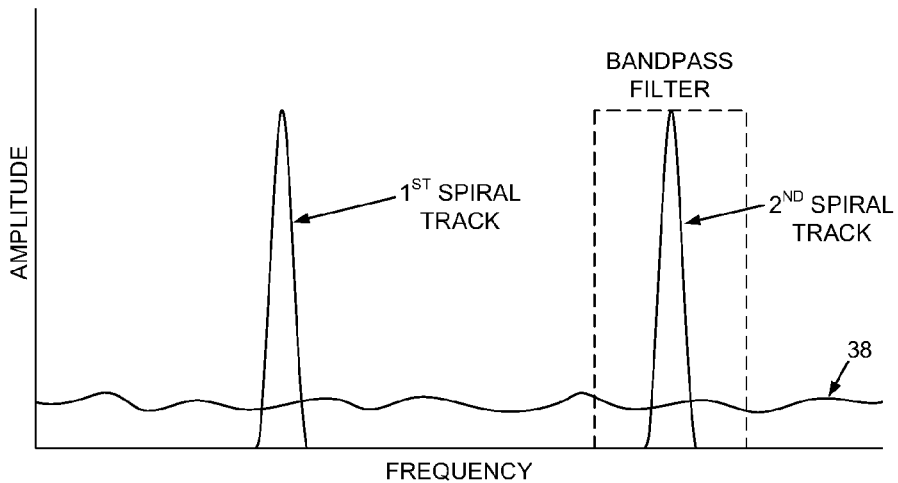
FIG. 8A shows an embodiment wherein sync marks in the first spiral track may interfere with the spectral signature of the second spiral track.
Figure 8B:
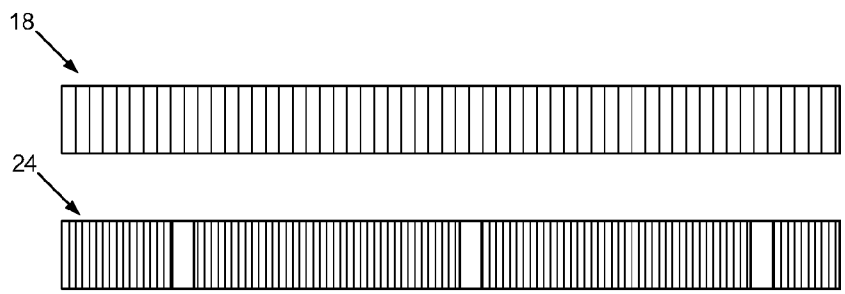
FIG. 8B shows an embodiment wherein the first spiral track consists primarily of a periodic pattern without sync marks, whereas the second spiral track comprises a periodic pattern with sync marks.
Figure 8C:
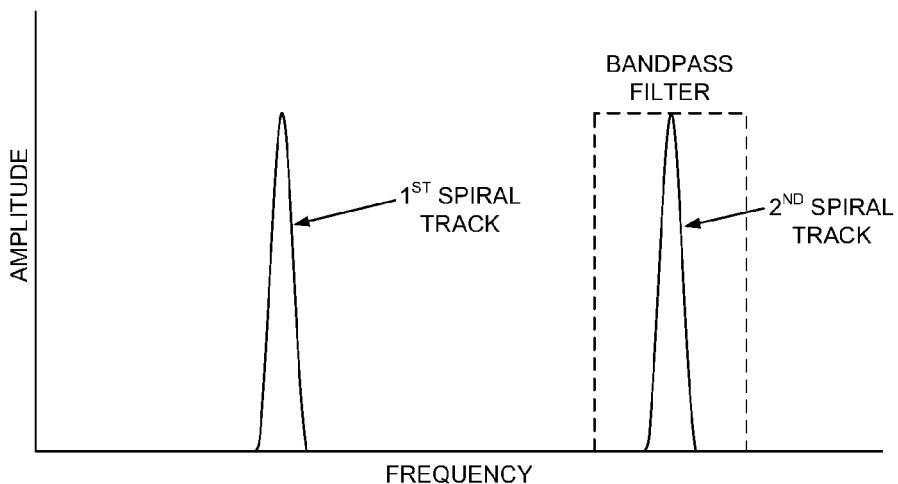
FIG. 8C shows an embodiment wherein recording the first spiral tracks without sync marks removes the interference from the spectral signature of the second spiral track as compared to FIG. 8A.

In the embodiment of FIG. 4A, the first spiral track 18 may comprise a periodic pattern written at a first frequency as well as sync marks which may facilitate demodulating the spiral track when writing the second spiral track 24. However, in one embodiment the sync marks in the first spiral track 18 may interfere with the demodulation of the second spiral track 24 when attempting to servo on the second spiral track 24 (e.g., when writing concentric servo sectors). This embodiment is illustrated in FIG. 8A wherein the frequency spectrum of the first spiral track 18 may comprise a peak at the frequency of the periodic pattern, as well as a frequency component 38 due to the sync marks that may overlap with the peak frequency component of the second spiral track 24. Accordingly, in one embodiment illustrated in FIG. 8B the first spiral track 18 may be written without sync marks (i.e., consist primarily of the periodic pattern written at the first frequency), thereby avoiding the interference when demodulating the second spiral track 24 by removing the frequency component as illustrated in FIG. 8C. In one embodiment, the first spiral track 18 may be demodulated using other techniques not based on sync marks. For example, the first spiral track 18 may be demodulated by evaluating a peak in the read signal generated when reading the first spiral track 18.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk surface comprising a first spiral track at least partially overwritten by a second spiral track;
   a head actuated over the disk surface; and
   control circuitry configured to servo the head over the disk surface based on the second spiral track;
   wherein:
   the first spiral track comprises a periodic pattern written at a first frequency; and
   the second spiral track comprises a periodic pattern written at a second frequency different from the first frequency.

2. The data storage device as recited in claim 1, wherein a ratio between the first frequency and the second frequency is substantially an integer plus one-half.

3. The data storage device as recited in claim 1, wherein a ratio between the second frequency and the first frequency is substantially an integer plus one-half.

4. The data storage device as recited in claim 1, wherein the control circuitry is further configured to:
   generate a read signal while reading the second spiral track; and
   filter the read signal based on the second frequency to attenuate crosstalk caused by the first spiral track.

5. The data storage device as recited in claim 4, wherein the control circuitry is further configured to bandpass filter the read signal proximate the second frequency.

6. The data storage device as recited in claim 4, wherein:
   the first spiral track consists of the first periodic pattern; and
   the second spiral track comprises a sync mark periodically interrupting the second periodic pattern.

7. The data storage device as recited in claim 1, wherein:
   the first spiral track consists of the first periodic pattern; and
   the second spiral track comprises a sync mark periodically interrupting the second periodic pattern.

8. A method of operating a data storage device, the method comprising servoing a head over a disk surface based on a second spiral track on the disk surface, wherein:
   a first spiral track on the disk surface is at least partially overwritten by the second spiral track;
   the first spiral track comprises a periodic pattern written at a first frequency; and the second spiral track comprises a periodic pattern written at a second frequency different from the first frequency.

9. The method as recited in claim 8, wherein a ratio between the first frequency and the second frequency is substantially an integer plus one-half.

10. The method as recited in claim 8, wherein a ratio between the second frequency and the first frequency is substantially an integer plus one-half.

11. The method as recited in claim 8, further comprising:
generating a read signal while reading the second spiral track; and
filtering the read signal based on the second frequency to attenuate crosstalk caused by the first spiral track.

12. The method as recited in claim 11, further comprising bandpass filtering the read signal proximate the second frequency.

13. The method as recited in claim 11, wherein:
the first spiral track consists of the first periodic pattern; and
the second spiral track comprises a sync mark periodically interrupting the second periodic pattern.

14. The method as recited in claim 8, wherein:
the first spiral track consists of the first periodic pattern; and
the second spiral track comprises a sync mark periodically interrupting the second periodic pattern.

* * * * *